United States Patent
McGrew et al.

(10) Patent No.: US 10,452,846 B2
(45) Date of Patent: Oct. 22, 2019

(54) OS START EVENT DETECTION, OS FINGERPRINTING, AND DEVICE TRACKING USING ENHANCED DATA FEATURES

(71) Applicant: Cisco Technology, Inc., San Jose, CA (US)

(72) Inventors: David McGrew, Poolesville, MD (US); Blake Harrell Anderson, San Jose, CA (US); Subharthi Paul, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 138 days.

(21) Appl. No.: 15/648,626

(22) Filed: Jul. 13, 2017

(65) Prior Publication Data
US 2019/0018955 A1    Jan. 17, 2019

(51) Int. Cl.
| | | |
|---|---|---|
| G06F 21/55 | (2013.01) | |
| G06F 9/4401 | (2018.01) | |
| G06F 11/14 | (2006.01) | |
| H04L 29/06 | (2006.01) | |
| H04L 29/08 | (2006.01) | |
| H04L 12/24 | (2006.01) | |
| G06F 21/56 | (2013.01) | |
| G06N 20/00 | (2019.01) | |

(52) U.S. Cl.
CPC .......... *G06F 21/554* (2013.01); *G06F 9/4403* (2013.01); *G06F 9/4406* (2013.01); *G06F 11/1435* (2013.01); *G06F 21/566* (2013.01); *G06N 20/00* (2019.01); *H04L 41/16* (2013.01); *H04L 63/1416* (2013.01); *H04L 63/1425* (2013.01); *H04L 67/22* (2013.01)

(58) Field of Classification Search
CPC ............. H04L 63/1408; H04L 63/1416; H04L 63/1425; G06F 21/554
See application file for complete search history.

(56) References Cited

U.S. PATENT DOCUMENTS 7,886,065 B1 * 2/2011 Satish ................... G06F 21/554
                                                    370/352
8,635,697 B2    1/2014 McNamee et al.
(Continued)

FOREIGN PATENT DOCUMENTS

WO    2016/160132 A1    10/2016

OTHER PUBLICATIONS

Bellovin, Steven M., "A Technique for Counting NATted Hosts", IMW '02, Nov. 6-8, 2002, Marseille, France, 6 pages, 2002, ACM.
(Continued)

*Primary Examiner* — David J Pearson
(74) *Attorney, Agent, or Firm* — Behmke Innovation Group LLC; James Behmke; Stephen D. LeBarron (57) ABSTRACT

In one embodiment, a device in a network tracks changes in a source port or address identifier indicated by network traffic associated with a particular host in the network. The device detects an operating system start event based on the track changes in the source port or address identifier indicated in the traffic data associated with the particular host. The device provides data regarding the detected operating system start event as input to a machine learning-based malware detector. The device causes performance of a mitigation action in the network when the malware detector determines that the particular host is infected with malware.

20 Claims, 8 Drawing Sheets

(56) References Cited

U.S. PATENT DOCUMENTS

| | | | |
|---|---|---|---|
| 9,009,332 B1 | | 4/2015 | Remizov |
| 2002/0144156 A1* | | 10/2002 | Copeland, III ....... H04L 43/026 |
| | | | 726/22 |
| 2010/0332641 A1 | | 12/2010 | Shanmugasundaram et al. |
| 2012/0053925 A1 | | 3/2012 | Geffin et al. |
| 2014/0033310 A1* | | 1/2014 | Cheng ................ H04L 63/1416 |
| | | | 726/23 |
| 2014/0373148 A1* | | 12/2014 | Nelms ................ H04L 63/1441 |
| | | | 726/23 |
| 2017/0222922 A1* | | 8/2017 | Zlatokrilov .......... H04L 43/106 |

OTHER PUBLICATIONS

Kohno, et al., "Remote physical device fingerprinting", IEEE Symposium on Security and Privacy 2005, 29 pages, May 2005, IEEE Computer Society Press.

Larsen, et al., "Recommendations for Transport-Protocol Port Randomization", Request for Comments 6056, Jan. 2011, 29 pages, Internet Engineering Task Force Trust.

Lippmann, et al., "Passive Operating System Identification From TCP/IP Packet Headers", Workshop on Data Mining for Computer Security, 10 pages, 2003, Citeseer.

Spitzner, Lance., "Know Your Enemy: Passive Fingerprinting", http://project.honeynet.org/papers/finger, 2 pages, 2000.

Tyagi, et al., "Packet Inspection for Unauthorized OS Detection in Enterprises", IEEE Security & Privacy, vol. 13, Issue: 4, Jul.-Aug. 2015, pp. 60-65, Aug. 2015, IEEE.

Michal Zalewski. p0f—passive os fingerprinting tool. Bugtraq mailing list archives, 2000.

European Search Report dated Oct. 16, 2018 in connection with European Application No. 18182036.

* cited by examiner

OS START EVENT DETECTION, OS FINGERPRINTING, AND DEVICE TRACKING USING ENHANCED DATA FEATURES

TECHNICAL FIELD

The present disclosure relates generally to computer networks, and, more particularly, to operating system (OS) start event detection, OS fingerprinting, and device tracking using enhanced data features.

BACKGROUND

In general, behavioral analytics is a branch of network administration that seeks to gain insight into the operation of the network by assessing the behaviors of the devices in the network. This insight can then be used for a variety of different purposes such as making load balancing decisions, security assessments, access control, to ensure that traffic quality of service (QoS) levels are met, and the like. For example, in the context of network security, a host device infected with malware may exhibit behavioral changes when compared to non-infected hosts, thereby facilitating detection of even previously unknown types of malware.

While behavioral analytics can be quite powerful in certain situations, capturing and reporting information about the monitored devices for use by a behavioral analytics system is itself a distinct branch of study. In particular, much like Heisenberg's Uncertainty Principle, the very nature of observing device behavior in the network can have an effect on the behavior of the devices and of the network as a whole. Typically, the more information gathered and collected about the behavior of a device, the more the behavior of the device and the network at large may change. For example, executing a monitoring agent on a host device to capture information about the behavior of the device will consume available resources of the host. Further, reporting large amounts of collected data regarding the behavior of a host will consume network bandwidth and other resources, which could impinge on user traffic in the network.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device in a network tracks changes in a source port or address identifier indicated by network traffic associated with a particular host in the network. The device detects an operating system start event based on the track changes in the source port or address identifier indicated in the traffic data associated with the particular host. The device provides data regarding the detected operating system start event as input to a machine learning-based malware detector. The device causes performance of a mitigation action in the network when the malware detector determines that the particular host is infected with malware.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

Figure 1A:
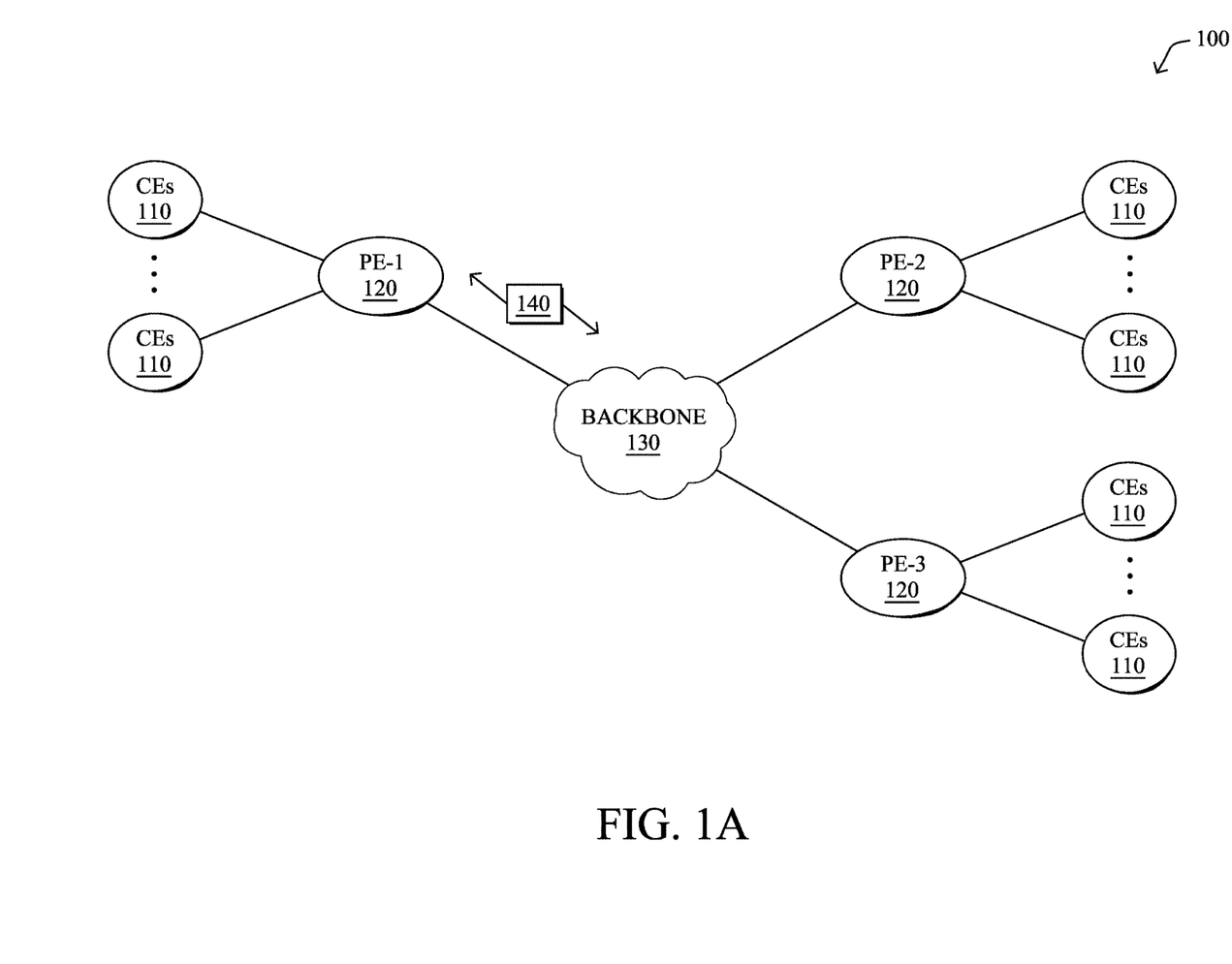
FIGS. 1A-1B illustrate an example communication network.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different service providers), with potentially a backup link (e.g., a 3G/4G/LTE connection). A site of type B may itself be of different types:

2a.) Site Type B1: a site connected to the network using two MPLS VPN links (e.g., from different service providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
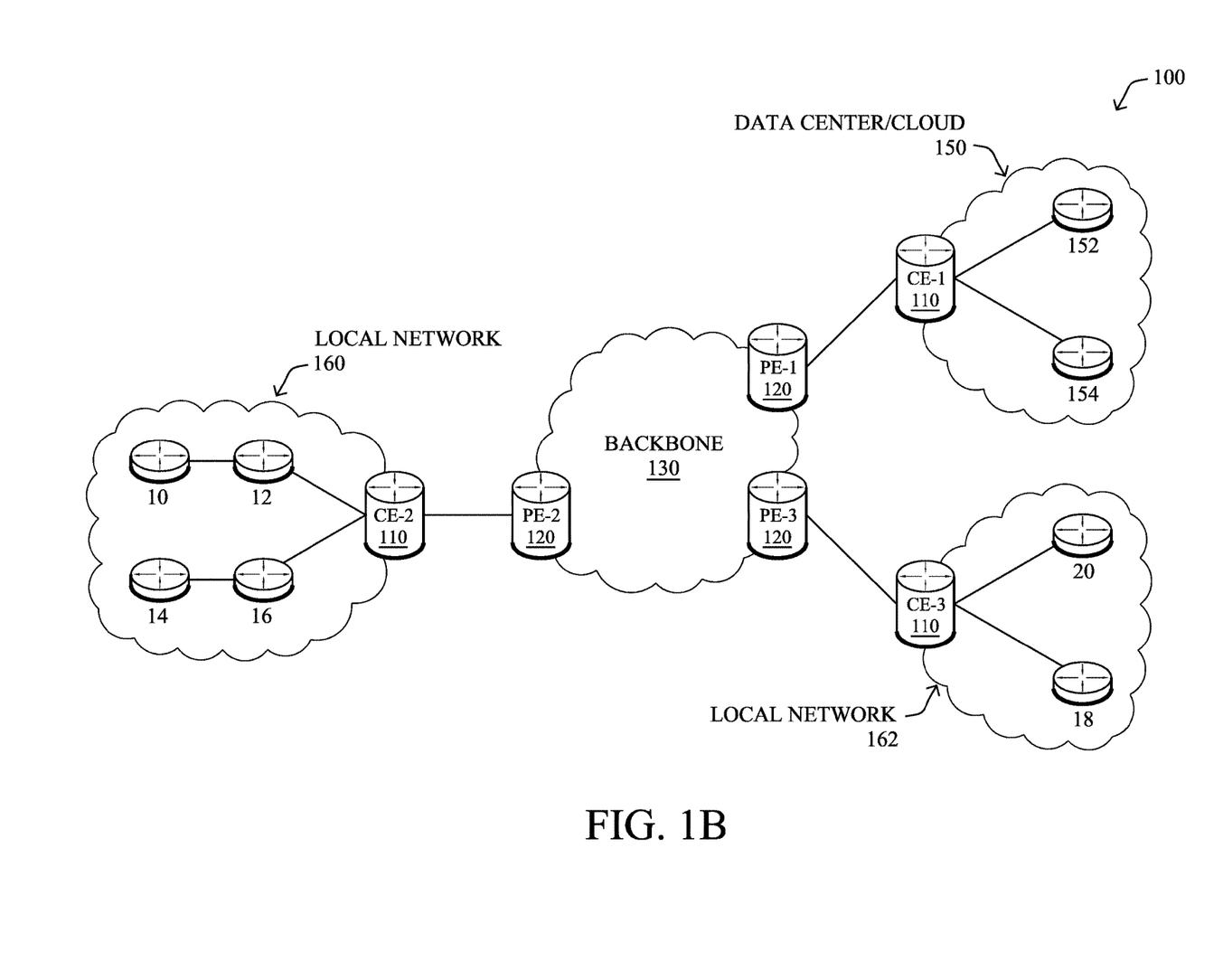

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
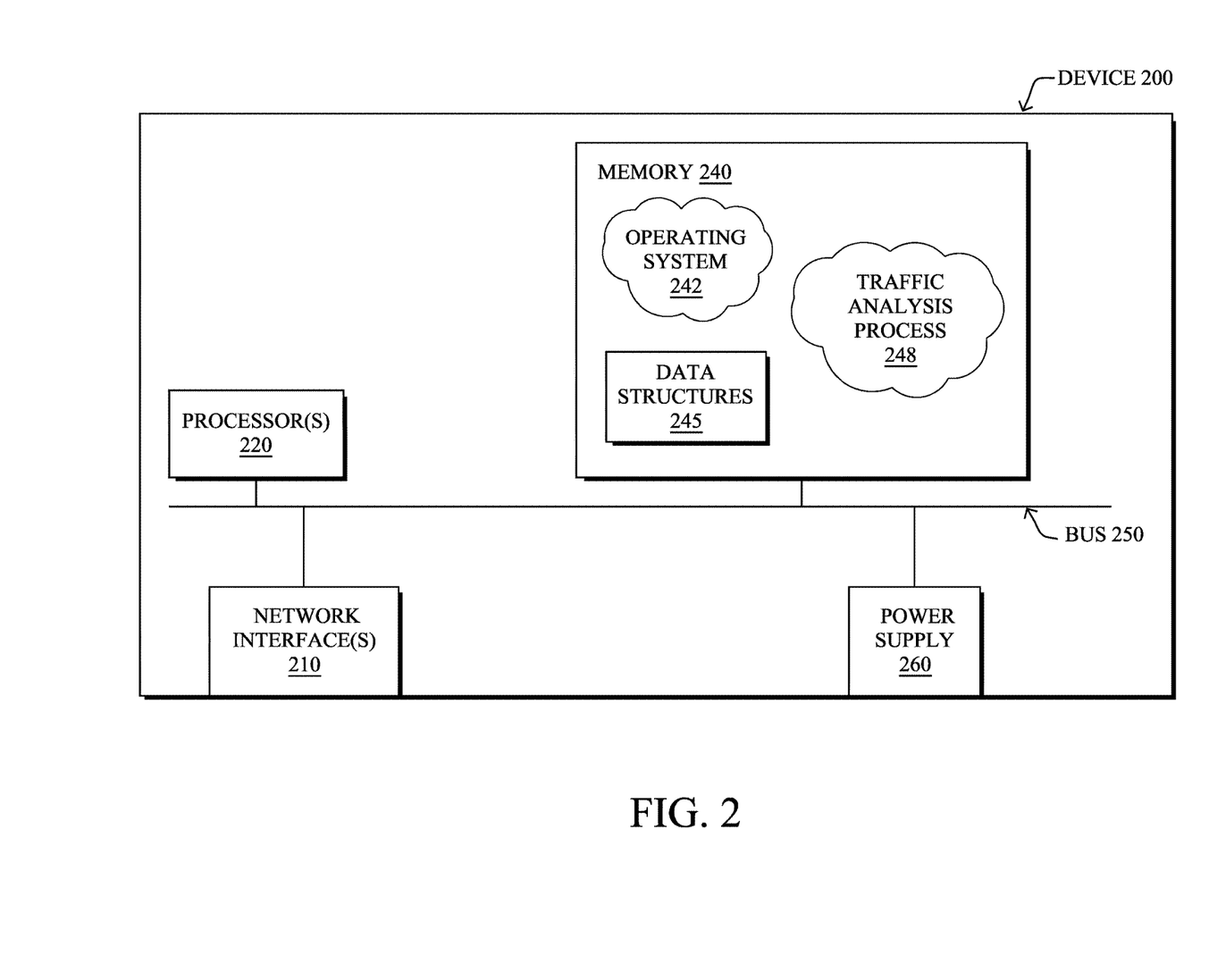
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a traffic analysis process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, traffic analysis process 248 may execute one or more machine learning-based classifiers to classify traffic in the network for any number of purposes. In one embodiment, traffic analysis process 248 may assess captured telemetry data regarding one or more traffic flows, to determine whether a given traffic flow or set of flows are caused by malware in the network, such as a particular family of malware applications. Example forms of traffic that can be caused by malware may include, but are not limited to, traffic flows reporting exfiltrated data to a remote entity, spyware or ransomware-related flows, command and control (C2) traffic that oversees the operation of the deployed malware, traffic that is part of a network attack, such as a zero day attack or denial of service (DoS) attack, combinations thereof, or the like. In further embodiments, traffic analysis process 248 may classify the gathered telemetry data to detect other anomalous behaviors (e.g., malfunctioning devices, misconfigured devices, etc.), traffic pattern changes (e.g., a group of hosts begin sending significantly more or less traffic), or the like.

Traffic analysis process 248 may employ any number of machine learning techniques, to classify the gathered traffic data. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function is a function of the number of misclassified points. The learning process then operates by adjusting the parameters a,b,c such that the number of misclassified points is minimal. After this optimization/learning phase, traffic analysis 248 can use the model M to classify new data points, such as information regarding new traffic flows in the network. Often, M is a statistical model, and the cost function is inversely proportional to the likelihood of M, given the input data.

In various embodiments, traffic analysis process 248 may employ one or more supervised, unsupervised, or semi-supervised machine learning models. Generally, supervised learning entails the use of a training set of data, as noted above, that is used to train the model to apply labels to the input data. For example, the training data may include sample telemetry data that is "normal," or "malware-generated." On the other end of the spectrum are unsupervised techniques that do not require a training set of labels. Notably, while a supervised learning model may look for previously seen attack patterns that have been labeled as such, an unsupervised model may instead look to whether there are sudden changes in the behavior of the network traffic. Semi-supervised learning models take a middle ground approach that uses a greatly reduced set of labeled training data.

Example machine learning techniques that traffic analysis process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of traffic flows that are incorrectly classified as malware-generated, anomalous, etc. Conversely, the false negatives of the model may refer to the number of traffic flows that the model incorrectly classifies as normal, when actually malware-generated, anomalous, etc. True negatives and positives may refer to the number of traffic flows that the model correctly classifies as normal or malware-generated, etc., respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In some cases, traffic analysis process 248 may assess the captured telemetry data on a per-flow basis. In other embodiments, traffic analysis 248 may assess telemetry data for a plurality of traffic flows based on any number of different conditions. For example, traffic flows may be grouped based on their sources, destinations, temporal characteristics (e.g., flows that occur around the same time, etc.), combinations thereof, or based on any other set of flow characteristics.

Figure 3:
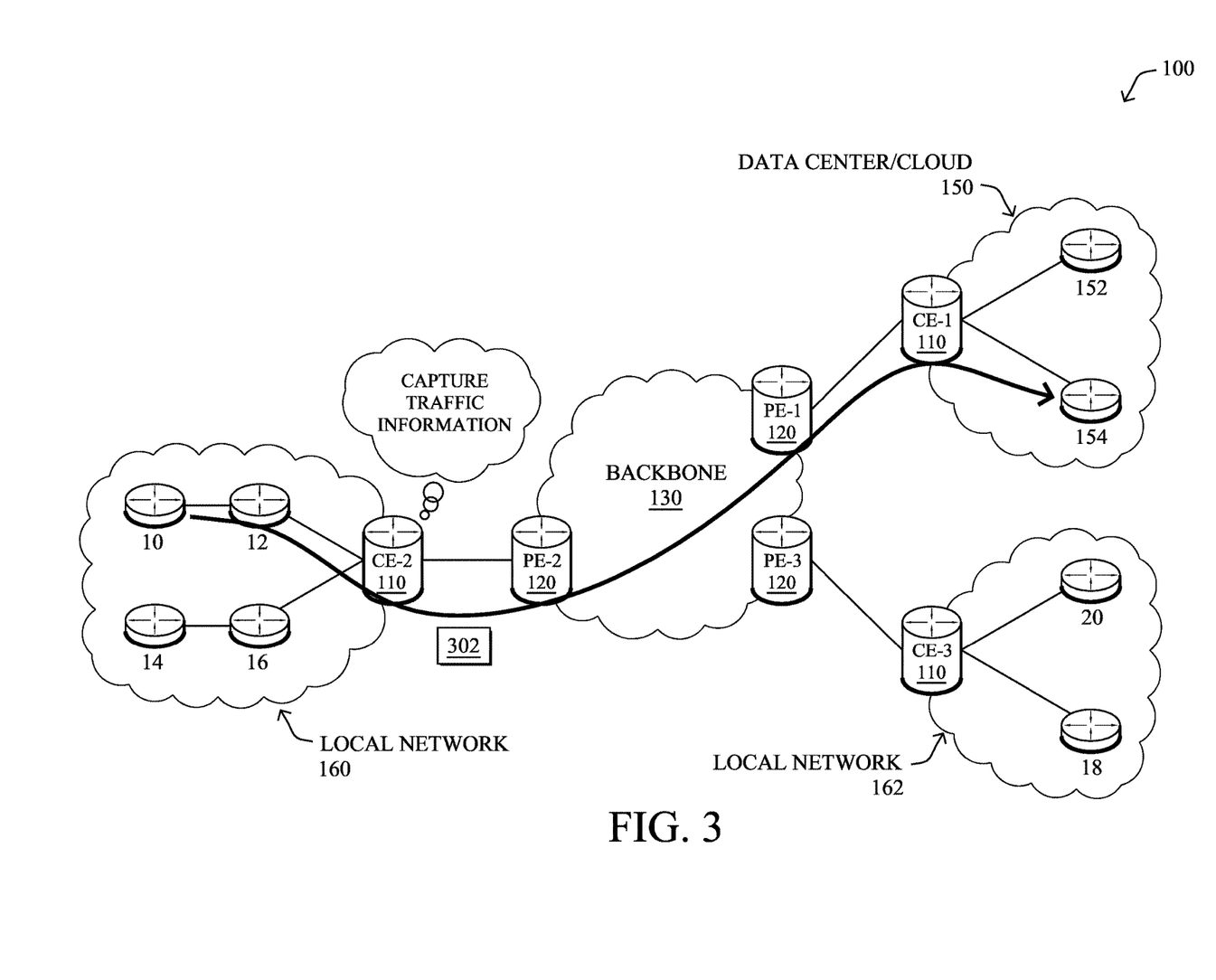
FIG. 3 illustrates an example of a device capturing traffic information.

As shown in FIG. 3, various mechanisms can be leveraged to capture information about traffic in a network, such as telemetry data regarding a traffic flow. For example, consider the case in which client node 10 initiates a traffic flow with remote server 154 that includes any number of packets 302. Any number of networking devices along the path of the flow may analyze and assess packet 302, to capture telemetry data regarding the traffic flow. For example, as shown, consider the case of edge router CE-2 through which the traffic between node 10 and server 154 flows.

In some embodiments, a networking device may analyze packet headers, to capture feature information about the traffic flow. For example, router CE-2 may capture the source address and/or port of host node 10, the destination address and/or port of server 154, the protocol(s) used by packet 302, or other header information by analyzing the header of a packet 302. Example captured features may include, but are not limited to, Transport Layer Security (TLS) information (e.g., from a TLS handshake), such as the ciphersuite offered, user agent, TLS extensions, etc., Hypertext Transfer Protocol (HTTP) information (e.g., URI, etc.), Domain Name System (DNS) information, or any other data features that can be extracted from the observed traffic flow(s).

In further embodiments, the device may also assess the payload of the packet to capture information about the traffic flow. For example, router CE-2 or another device may perform deep packet inspection (DPI) on one or more of packets 302, to assess the contents of the packet. Doing so may, for example, yield additional information that can be used to determine the application associated with the traffic flow (e.g., packets 302 were sent by a web browser of node 10, packets 302 were sent by a videoconferencing application, etc.).

The networking device that captures the flow telemetry data may also compute any number of statistics or metrics regarding the traffic flow. For example, CE-2 may determine the start time, end time, duration, packet size(s), the distribution of bytes within a flow, etc., associated with the traffic flow by observing packets 302. In further examples, the capturing device may capture sequence of packet lengths and time (SPLT) data regarding the traffic flow, sequence of application lengths and time (SALT) data regarding the traffic flow, or byte distribution (BD) data regarding the traffic flow.

As noted above, actively capturing and reporting all available data features regarding the behavior of a device may be too cumbersome in many deployments due to the resulting consumption of device and network resources. However, this does not diminish the value of certain data features from a behavioral analytics standpoint. For example, operating system (OS) start events (e.g., boots, restarts, etc.) can be indicative of a host being infected with malware, since some malware can force restarts and because a newly started device may indicate a new virtual machine instance.

OS Start Event Detection, OS Fingerprinting, and Device Tracking Using Enhanced Data Features The techniques herein allow for the passive monitoring of a number of different host behavioral features without requiring explicit reporting of these features by the network hosts. In particular, the techniques allow a behavioral analytics system to infer a number of features about a host in the network based on an analysis of the traffic associated with the host. In various aspects, these features may include indications of host OS start events, OS fingerprinting, device tracking, application identification, and other host features that can be identified through traffic analysis using the techniques herein. In further aspects, these passively identified features can be used as input to a malware detector or other behavioral analyzer, thereby allowing for greater detection of malware in the network and for mitigation actions to be performed as needed.

Specifically, according to one or more embodiments of the disclosure as described in detail below, a device in a network tracks changes in a source port or address identifier indicated by network traffic associated with a particular host in the network. The device detects an operating system start event based on the track changes in the source port or address identifier indicated in the traffic data associated with the particular host. The device provides data regarding the detected operating system start event as input to a machine learning-based malware detector. The device causes performance of a mitigation action in the network when the malware detector determines that the particular host is infected with malware.

Illustratively, the techniques described herein may be performed by hardware, software, and/or firmware, such as in accordance with the traffic analysis process 248, which may include computer executable instructions executed by the processor 220 (or independent processor of interfaces 210) to perform functions relating to the techniques described herein.

Operationally, one aspect of the traffic analysis techniques herein is host identification, which is performed to associate a particular host with each of the traffic flows that it sends and receives. While an IP source address can sometimes be used to map a flow to a host, dynamic IP address assignment with DHCP and Network Address Translation (NAT) both complicate this process. Notably, DHCP can change the host associated with an address, so that the host-to-address mapping is different before and after address reassignment. With NAT, multiple hosts can be associated with a single source address, making host identification impossible unless network data other than the source address are used. The use of NAT is also widespread and NAT is used in many server load balancers to achieve scalable Internet services, in some service provider networks (e.g., as Carrier-Grade NAT, or CGN), and in virtual machines on both servers and laptops, as well as firewalls and consumer-grade routers.

A related function of the techniques herein is OS start detection, that is, the identification of OS (re)boots/(re)starts from the network traffic, in various embodiments. Based on preliminary testing, OS start events have been shown to be relevant from a network security standpoint because they are sometimes triggered by infections, and they are associated with some pseudorandom number generator vulnerabilities. In addition, OS start event detection helps to distinguish between rebooted machines and mobile devices that have joined the network at a new location.

Figure 4:
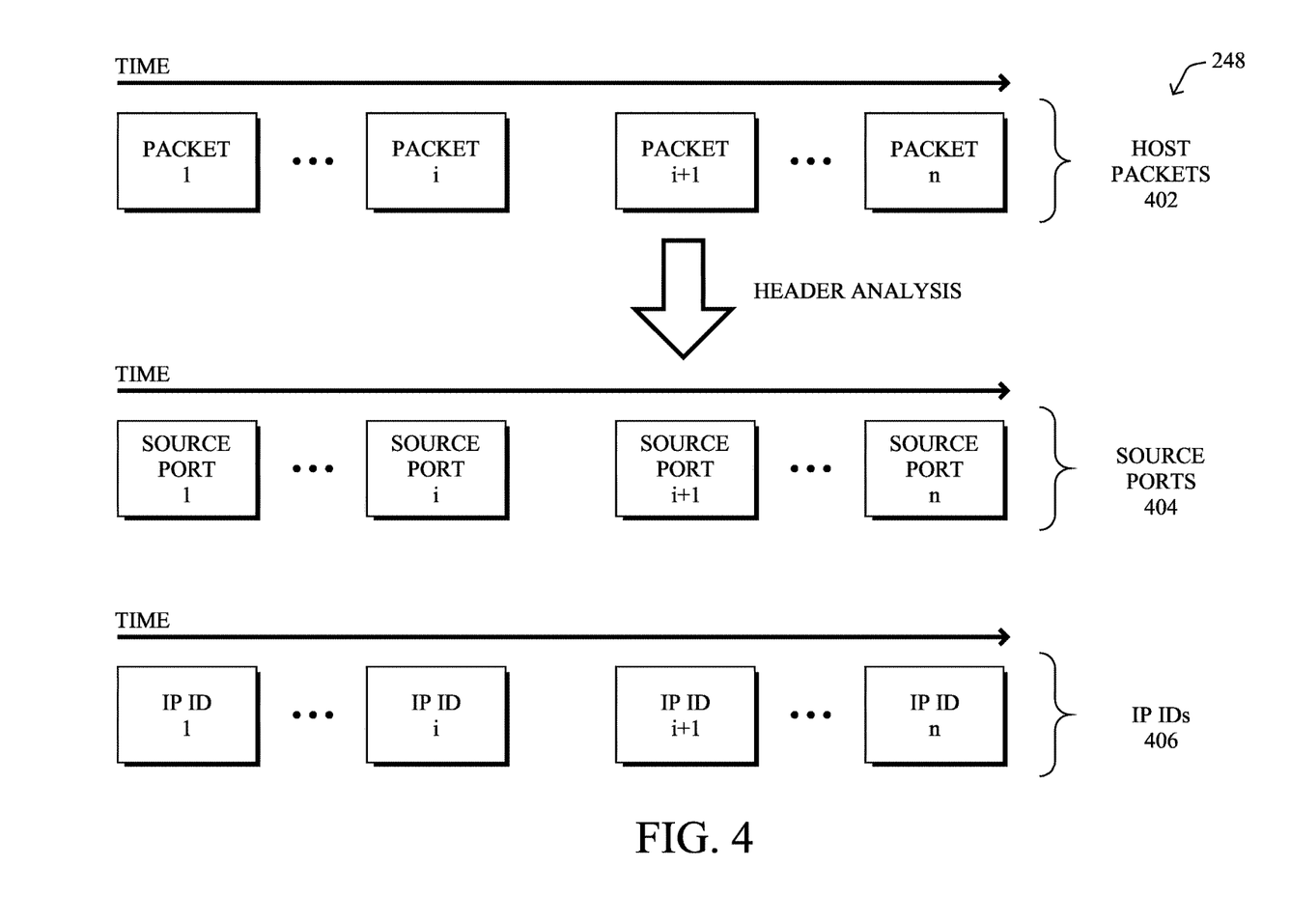
FIG. 4 illustrates an example of the tracking of host network traffic.

FIG. 4 illustrates an example of the tracking of host network traffic, according to various embodiments. As shown, assume that n-number of traffic packets 402 are sent by, or are otherwise associated with, a given host in the network. Such traffic may utilize any number of different protocols and may or may not employ encryption to protect the contents of their payloads. Analysis of the header information of packets 402 allows for the identification of certain features of the associated host device that can then be used in more complex machine learning analysis of the behavior of the host.

In various embodiments, the different traffic features available from packets 402 may be used to form sequences of these tracked features. For example, assume that packets 402 are sent in a sequence over time comprising the set of n-number of packets {1, . . . , i, i+1, . . . n). Through the analysis of the headers of the individual packets 402, the traffic analyzer can identify the corresponding sequences of the traffic features over time. For example, one tracked traffic feature may be the TCP or UDP source ports indicated by the headers of packets 402, in one embodiment. Thus, from the analysis of packets 402, the traffic analyzer can obtain a corresponding sequence of n-number of source ports used in packets 402. Similarly, in another embodiment, a further such traffic feature may be the IP identifiers (IDs) 406 indicated by the headers of packets 402. In this way, the traffic analyzer can track the sequences of any number of fields or other data available from packets 402 over the course of time.

Preliminary testing of the use of traffic features such as source ports and IP IDs by different operating systems has yielded the following insights. First, many operating systems exhibit a predictable pattern with respect to their use of source ports and IP IDs in their traffic. Second, the ranges of these values may also be OS-specific, allowing for the identification/fingerprinting of the OS directly from its observed network traffic.

More specifically, it has been shown that port selection is performed by the common operating systems listed below as follows:

MacOS: source ports for each TCP session are assigned sequentially, starting at 49,000.

Linux: TCP ports are assigned in accordance with the Internet Engineering Task Force (IETF) Request for Comments (RFC) 6056 document entitled "Recommendations for Transport-Protocol Port Randomization," by M. Larsen et al. Typically, this port usage falls within the range of 32,000-61,000 using the following approach:

offset=F(local_IP, remote_IP, remote_port, secret_key);
port=offset+next_ephemeral++;

Windows: follows the same strategy as Linux, except the ephemeral range is 49,000-65,000.

The above information can be leveraged to passively infer a number of host features through the analysis of the network traffic associated with the host. Such features include, in various embodiments, OS start events by the host, the actual OS executed by the host, applications executed by the host, and/or movements of the host from a networking standpoint.

Figure 5A:
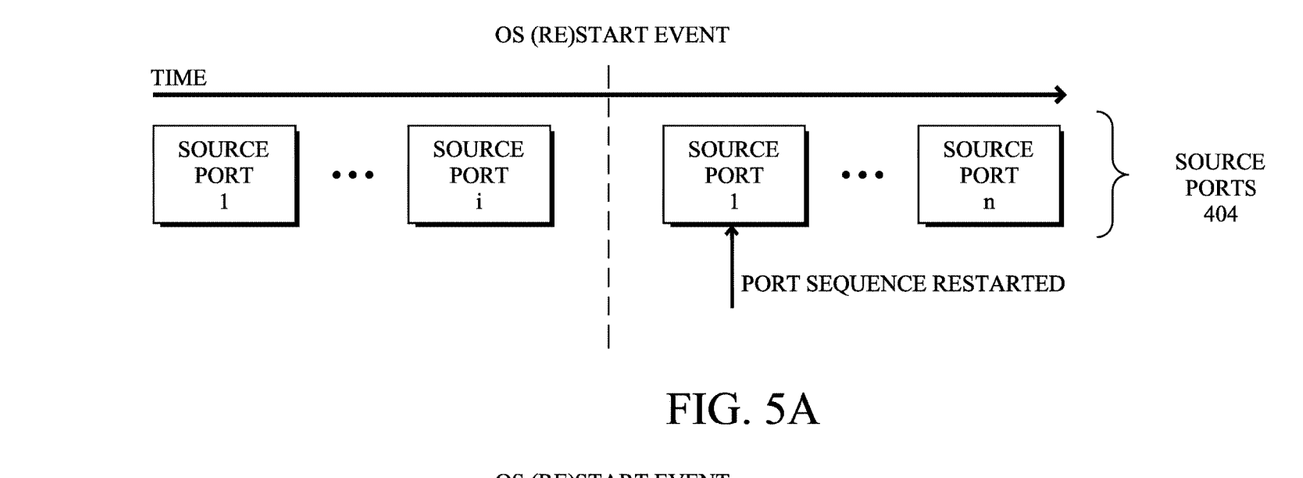
FIGS. 5A-5B illustrate examples of the detection of operating system start events from tracked network traffic.
Figure 5B:
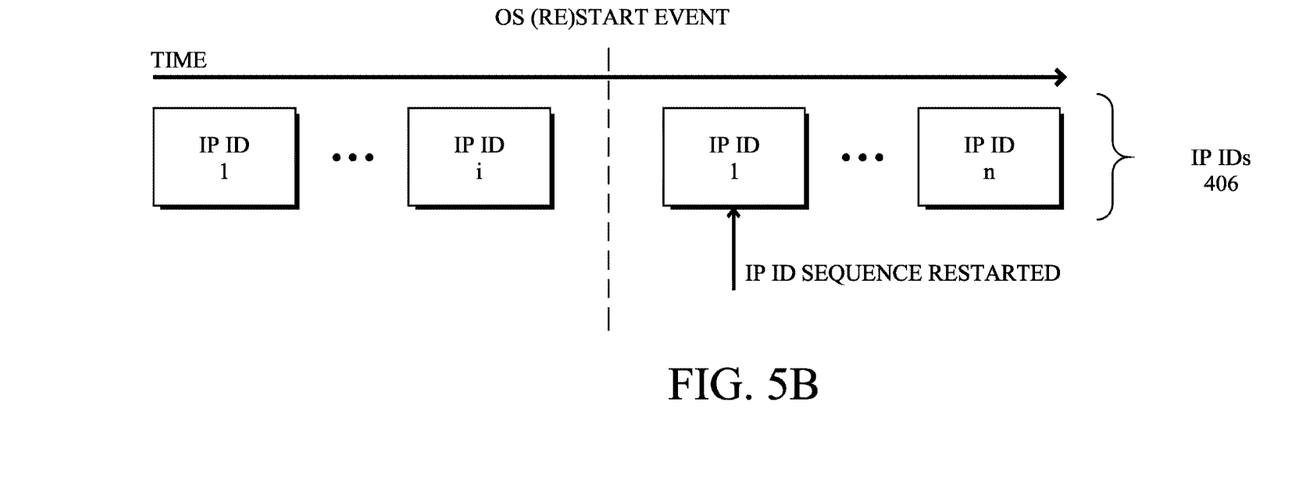

FIGS. 5A-5B illustrate examples of the detection of operating system start events from tracked network traffic, in accordance with various embodiments herein. A key insight into the use of the source port and IP ID fields by different operating systems is that these values are typically incremented with time until an OS start event occurs. By detecting non-sequential changes in the source ports or IP ID fields of a host's traffic, the traffic analyzer can pinpoint when OS start events have occurred.

For example, as shown in FIG. 5A, assume that the sequence of source ports observed from host packets 402 is of the form {1, . . . i} up until the occurrence of the start event. Rather than continuing the sequence (e.g., with source port i+1), however, a typical OS will jump non-sequentially back to the start of the sequence (e.g., by beginning again with source port 1). In the case of MacOS, for example, it has been observed that the source port will reset to 49,000 after the occurrence of an OS start event.

In FIG. 5B, a similar resetting pattern has been observed in certain IP ID fields after the occurrence of an OS start event. For example, if the sequence {1, . . . i} of IP IDs 406 has been observed for a given host, but then is followed by a resetting of the sequence back to the initial IP ID, this is a strong indicator that an OS start event has occurred. Notably, many devices have been shown to start their IP ID values at '0' and begin incrementing from there until a OS start event occurs.

Information about the sequential nature of the source port and IP ID fields can also be used to detect when a device from one network attaches to another, according to some embodiments. This is particularly useful for purposes of host identification. In particular, traffic from the same host can be associated back to that host by finding a sequence of source ports or IP IDs in traffic from one network that can be pieced together with a corresponding sequence from another network.

Information about the sequences of source ports and/or IP IDs used by different operating systems can also be leveraged to perform OS fingerprinting or application identification. In some embodiments, header features of packets such as user agent strings (from HTTP traffic) and TLS ClientHello fingerprints (from HTTPS traffic) can provide a strong indication of the OS of the host and/or application executed by the host, whenever present in the headers of packets. However, useful features such as these do not appear in every protocol, or even in every session of HTTP (since the User-agent can be modified by applications and users) and HTTPS (due to session resumption). In contrast, the TCP/UDP source port and IP ID fields do appear in every packet, and they can provide an indication of the OS (and sometimes the application), though this indication is usually more coarse-grained than that provided by application data features, such as user agents and ClientHello field values.

In various embodiments, the traffic analyzer may use both application indicators, such as user agent or ClientHello field entries, in combination with TCP/IP header data, such as source port or IP ID, to infer the OS of the host. For example, when the application data features are not available, the traffic analyzer may infer the OS from the TCP/IP data. However, when an application data features are available, the traffic analyzer may use those features in conjunction with the TCP/IP data to estimate the OS. In each case, the system assigns each flow to a host. In turn, the host can be represented in a logical model using its source address, IP ID sequence, and OS, as well as, optionally, a TCP timestamp, a TCP Initial Sequence Number (ISN) seed, and/or TCP source port seed. The seed values, as explained below, are short values that are typically initialized at boot time, which can sometimes be inferred from traffic.

Figure 6A:
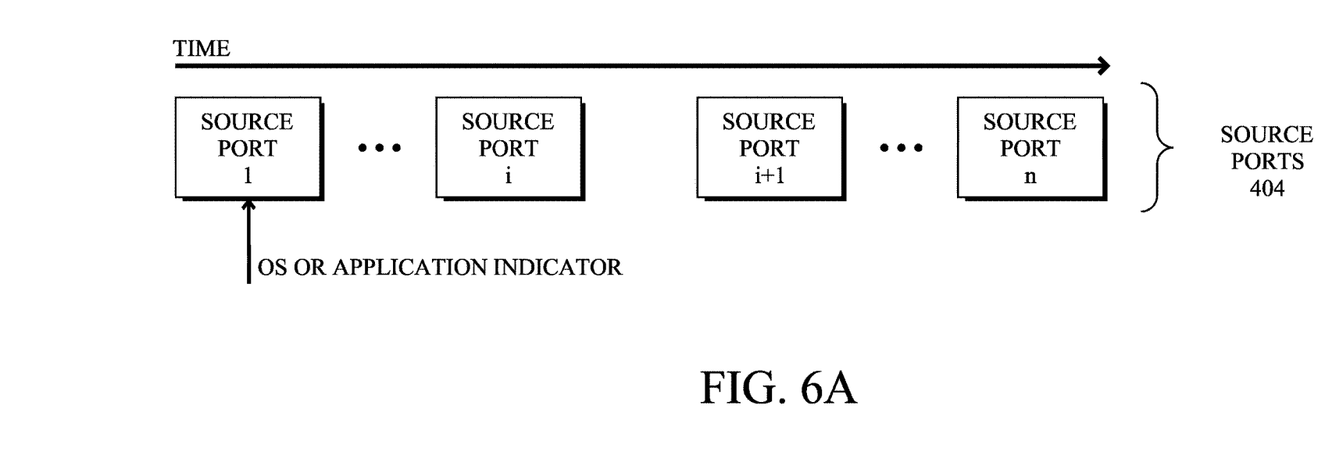
FIGS. 6A-6B illustrate examples of operating system fingerprinting from tracked network traffic.
Figure 6B:
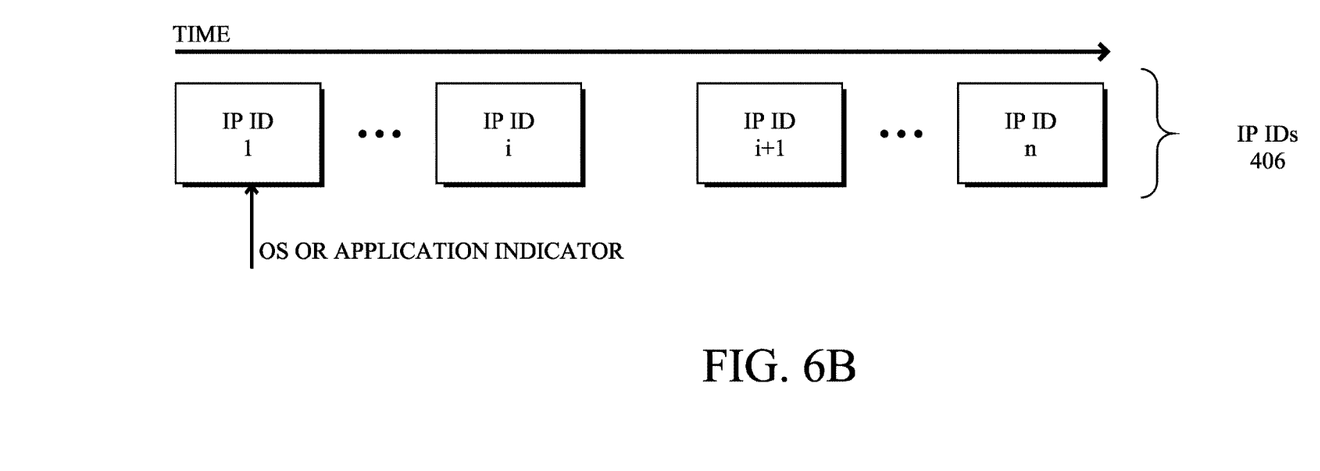

Generally, the traffic analyzer can infer the OS of the host by assessing one or more source ports in the traffic associated with the host. For example, as shown in FIG. 6A, the initial source port used and/or the progression of source ports 404 in the sequence, can be an indicator of the host OS or application that sent the traffic. Similarly, as shown in FIG. 6B, the initial IP ID and/or the progression of IP IDs 406 in the sequence, can be an indicator of the host OS or application that sent the traffic. Note that certain situations may also require the assessment of the source port(s) and IP ID(s) in conjunction with one another, to determine the OS or application of the host.

For example, if two or more sessions from a host are observed that are bound to the same destination address and destination port, then the variable 'offset' in the above equations will be identical if the host OS is Linux, and the source ports will thus be close. In turn, if another session to a distinct destination address or port is observed, and it is not close, then the device is likely Linux. Conversely, if the source ports are close even when destination addresses or ports are different, then the device is likely MacOS.

It is common for a device to have repeated sessions with popular Internet sites, such as google.com or Facebook.com, which provide the repeated sessions with identical destination ports and addresses needed in the above logic. Many devices and applications also have particular services that they routinely contact, e.g., to check for updates, which also provide sessions with repeated destinations.

Given the source port and IP ID values from a set of sessions, the most likely OS can be estimated by selecting the one that is most likely, as determined by a probabilistic model in which the 'offset' value is random for distinct inputs of the function F. If many sessions are available, a sequential hypothesis test can be applied to each session successively, until the likely OS is found.

Similar to the OS fingerprinting, application inference can take advantage of the fact that if a source port is outside the typical range for the given OS, then it has been set by the application and not the OS, and the value of the port is likely to be indicative of the executing application. Several applications have also been observed to exhibit this behavior. For example, McAfee executing on older versions of Windows typically use a source port range of 5,000-15,000.

In various embodiments, using a probabilistic model and sequential hypothesis testing based on traffic features such as the source ports, IP_ID, TCP headers, and available application data, has proven to give reasonably confident estimates of host features such as the OS of the host, whether the host was recently booted, etc. In turn, these hosts features can then be used as input to a machine learning-based traffic classifier, such as a malware detector. For example, in the case of malware traffic classification, the operating system can be embedded directly into the input feature vector and utilized for training/testing. This has a significant effect due to different malware families being targeted at specific operating systems.

Of further note is that a malware sample typically has a set of behaviors that it performs when the host device starts, e.g., ensuring persistence, registering with the botmaster, etc. By detecting an OS start event, the system can both collect benign training data that more closely matches the generative process of the malware samples, and test on subsets of data that more accurately match our training data distribution. This method allows for the training of more accurate classifiers, e.g., the malware classifier is not learning to detect OS start events, but rather what a malicious OS start event looks like.

When such a malware detector detects malware based in part on an analysis of any of the host features detected using the techniques herein, any number of mitigation actions can be initiated in the network. For example, such a mitigation action may comprise blocking the network traffic associated with the particular host or capturing copies of traffic packets associated with the particular host for further review. In another example, the mitigation action may entail sending an alert to an administrator or to another device, to take further action with respect to the host (e.g., contacting the user to schedule maintenance, etc.).
wherein the mitigation action comprises at least one of: blocking the network traffic associated with the particular host, generating an alert regarding the particular host, or capturing copies of packets of the network traffic associated with the particular host.

Figure 7:
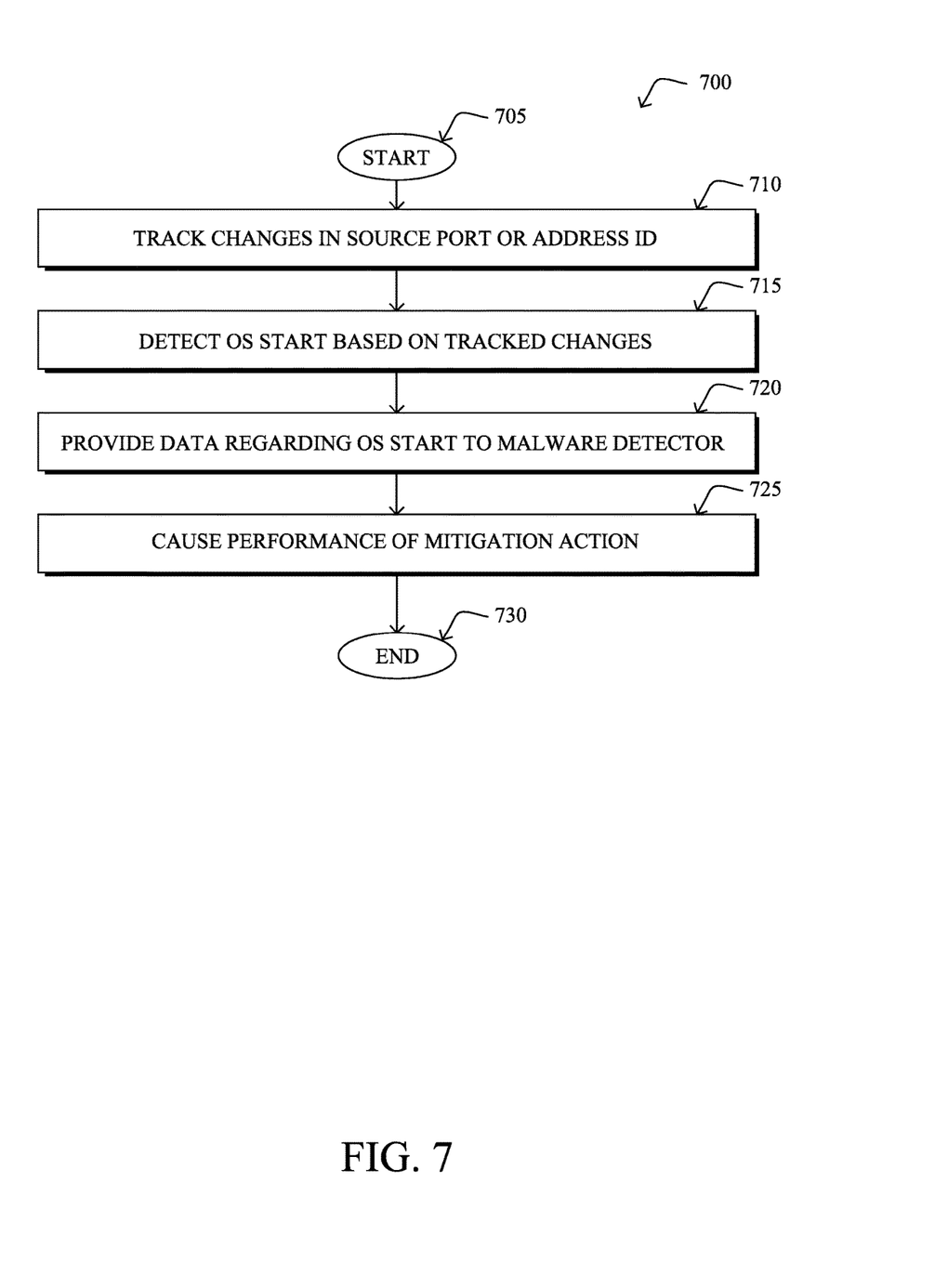
FIG. 7 illustrates an example simplified procedure for detecting operating system restarts in a network.

FIG. 7 illustrates an example simplified procedure for detecting operating system restarts in a network, in accordance with one or more embodiments described herein. For example, a non-generic, specifically configured device (e.g., device 200) may perform procedure 700 by executing stored instructions (e.g., process 248). The procedure 700 may start at step 705, and continues to step 710, where, as described in greater detail above, the device may track changes in a source port or address identifier indicated by network traffic associated with a particular host in the network. For example, the device may assess the source ports and/or IP IDs identified in the headers of packets associated with the host (e.g., traffic sent by the host, etc.).

At step 715, as detailed above, the device may detect an operating system start event based on the track changes in the source port or address identifier indicated in the traffic data associated with the particular host. Such a start event may be, for example, a complete powering up of the host (e.g., an initial boot or reboot) or, in the case of a virtual machine executed by the host, starting of the virtual machine. Notably, in many situations, the sequence of source ports and/or address identifiers used in the host's traffic may be incremented over time until the occurrence of an OS start event. By tracking is these traffic features and identifying non-sequential changes in the source port or IP IDs (e.g., re-initialization of the sequence), the device can discern when an OS start event has occurred.

At step 720, the device may provide data regarding the detected OS start event as input to a machine learning-based malware detector, as described in greater detail above. For example, such a detector may comprise a machine learning-based malware classifier that has been trained using a labeled set of training data and is configured to discern benign traffic from traffic associated with malware.

At step 725, as detailed above, the device may cause performance of a mitigation action in the network when the malware detector determines that the particular host is infected with malware. Such a mitigation action may entail blocking the network traffic associated with the particular host, generating an alert regarding the particular host, capturing copies of packets of the network traffic associated with the particular host, or any other mitigation action. Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the passive identification of certain host features (e.g., without requiring self-reporting by the host) through analysis of the network traffic associated with the host. By observing TCP source ports and IP ID fields from multiple sessions, some of which are to the same destination address and port, the system can estimate the OS generating the sessions, detect OS start events and, in some cases, make inferences about applications executed by the host. This information can be used for easily deployable visibility or to increase the efficacy of network-based malware classifiers.

While there have been shown and described illustrative embodiments that provide for the identification of certain host features through traffic analysis, it is to be understood that various other adaptations and modifications may be made within the spirit and scope of the embodiments herein. For example, while certain embodiments are described herein with respect to using certain models for purposes of malware detection, the models are not limited as such and may be used for other functions, in other embodiments. In addition, while certain protocols are shown, such as HTTP and HTTPS, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    tracking, by a device in a network, changes in a source port or address identifier indicated by network traffic associated with a particular host in the network;
    detecting, by the device, an operating system of the particular host in the network based on the source port indicated by the traffic associated with the particular host by:
        determining a source port offset based on a difference in the source port used by the host for different traffic sessions with the same destination address and destination port, and
        using the determined source port offset to determine the operating system of the particular host;
    detecting, by the device, an operating system start event based on the tracked changes in the source port or address identifier indicated in the traffic data associated with the particular host;
    providing, by the device, data regarding the detected operating system and the operating system start event as input to a machine learning-based malware detector; and
    causing, by the device, performance of a mitigation action in the network when the malware detector determines that the particular host is infected with malware.

2. The method as in claim 1, wherein the mitigation action comprises at least one of: blocking the network traffic associated with the particular host, generating an alert regarding the particular host, or capturing copies of packets of the network traffic associated with the particular host.

3. The method as in claim 1, wherein the machine learning-based malware detector comprises a malware classifier.

4. The method as in claim 1, wherein the address identifier is identified by the network traffic in an Internet Protocol (IP) identification (ID) field of IP headers of packets of the network traffic.

5. The method as in claim 1, wherein detecting the operating system start event based on the tracked changes in the source port or address identifier indicated in the traffic data associated with the particular host comprises:
    detecting, by the device, a non-sequential change in the source port or address identifier indicated in the traffic data associated with the particular host.

6. The method as in claim 1, further comprising:
    detecting, by the device, an application associated with the particular host in the network based on a determination that the source port indicated by the traffic associated with the host is outside of an expected range for a given operating system; and
    providing, by the device, data regarding the detected application as input to the machine learning-based malware detector.

7. The method as in claim 1, further comprising:
    detecting, by the device, a movement of the host by associating a first sequence of address identifiers indicated by the network traffic associated with the host with a second sequence of address identifiers indicated by the network traffic associated with the host.

8. The method as in claim 1, further comprising:
    identifying, by the device, a user agent string or ClientHello field entry from the traffic associated with the network traffic; and
    providing, by the device, data regarding the identified user agent or ClientHello field entry as input to the machine learning-based malware detector.

9. An apparatus, comprising:
    one or more network interfaces to communicate with a network;
    a processor coupled to the network interfaces and configured to execute one or more processes; and
    a memory configured to store a process executable by the processor, the process when executed configured to:
        track changes in a source port or address identifier indicated by network traffic associated with a particular host in the network;
        detect an operating system of the particular host in the network based on the source port indicated by the traffic associated with the particular host by:
            determine a source port offset based on a difference in the source port used by the host for different traffic sessions with the same destination address and destination port, and
            use the determined source port offset to determine the operating system of the particular host;
        detect an operating system start event based on the tracked changes in the source port or address identifier indicated in the traffic data associated with the particular host;
        provide data regarding the operating system and the detected operating system start event as input to a machine learning-based malware detector; and
        cause performance of a mitigation action in the network when the malware detector determines that the particular host is infected with malware.

10. The apparatus as in claim 9, wherein the machine learning-based malware detector comprises a malware classifier.

11. The apparatus as in claim 9, wherein the address identifier is identified by the network traffic in an Internet Protocol (IP) identification (ID) field of IP headers of packets of the network traffic.

12. The apparatus as in claim 9, wherein the apparatus detects the operating system start event based on the tracked changes in the source port or address identifier indicated in the traffic data associated with the particular host comprises:
    detecting, by the device, a non-sequential change in the source port or address identifier indicated in the traffic data associated with the particular host.

13. The apparatus as in claim 9, wherein the process when executed is further configured to:

detect an application associated with the particular host in the network based on a determination that the source port indicated by the traffic associated with the host is outside of an expected range for a given operating system; and providing, by the device, data regarding the detected application as input to the machine learning-based malware detector.

14. The apparatus as in claim 9, wherein the process when executed is further configured to:

detecting, by the device, a movement of the host by associating a first sequence of address identifiers indicated by the network traffic associated with the host with a second sequence of address identifiers indicated by the network traffic associated with the host.

15. The apparatus as in claim 9, wherein the process when executed is further configured to:

identify a user agent string or ClientHello field entry from the traffic associated with the network traffic; and provide data regarding the identified user agent or ClientHello field entry as input to the machine learning-based malware detector.

16. A tangible, non-transitory, computer-readable medium storing program instructions that cause a device to execute a process comprising:

tracking, by the device, changes in a source port or address identifier indicated by network traffic associated with a particular host in a network;

detecting, by the device, an operating system of the particular host in the network based on the source port indicated by the traffic associated with the particular host by:

determining a source port offset based on a difference in the source port used by the host for different traffic sessions with the same destination address and destination port, and using the determined source port offset to determine the operating system of the particular host;

detecting, by the device, an operating system start event based on the tracked changes in the source port or address identifier indicated in the traffic data associated with the particular host;

providing, by the device, data regarding the operating system and the detected operating system start event as input to a machine learning-based malware detector; and causing, by the device, performance of a mitigation action in the network when the malware detector determines that the particular host is infected with malware.

17. The tangible, non-transitory, computer-readable medium as in claim 16, wherein the mitigation action comprises at least one of: blocking the network traffic associated with the particular host, generating an alert regarding the particular host, or capturing copies of packets of the network traffic associated with the particular host.

18. The tangible, non-transitory, computer-readable medium as in claim 16, wherein the machine learning-based malware detector comprises a malware classifier.

19. The tangible, non-transitory, computer-readable medium as in claim 16, wherein detecting the operating system start event based on the tracked changes in the source port or address identifier indicated in the traffic data associated with the particular host comprises:

detecting, by the device, a non-sequential change in the source port or address identifier indicated in the traffic data associated with the particular host.

20. The tangible, non-transitory, computer-readable medium as in claim 16, the program instructions that cause the device to execute the process further comprising:

detecting, by the device, an application associated with the particular host in the network based on a determination that the source port indicated by the traffic associated with the host is outside of an expected range for a given operating system; and providing, by the device, data regarding the detected application as input to the machine learning-based malware detector.

* * * * *

UNITED STATES PATENT AND TRADEMARK OFFICE
CERTIFICATE OF CORRECTION

PATENT NO. : 10,452,846 B2
APPLICATION NO. : 15/648626
DATED : October 22, 2019
INVENTOR(S) : David McGrew et al.

Page 1 of 1

It is certified that error appears in the above-identified patent and that said Letters Patent is hereby corrected as shown below:

In the Specification

Column 12, Line 22, delete the word "is".

Signed and Sealed this
Seventh Day of January, 2020

Andrei Iancu
*Director of the United States Patent and Trademark Office*